United States Patent
Johansson et al.

(10) Patent No.: US 8,884,807 B1
(45) Date of Patent: Nov. 11, 2014

(54) PSEUDO REAL TIME RECEIVE SIGNAL SAMPLING FOR GROUND PENETRATING RADAR

(75) Inventors: Bernth A. T. Johansson, Malå (SE); Johan Gustaf Friborg, Vannasby (SE)

(73) Assignee: Malå Geoscience USA, Charleston, SC (US)

( * ) Notice: Subject to any disclaimer, the term of this patent is extended or adjusted under 35 U.S.C. 154(b) by 220 days.

(21) Appl. No.: 13/467,486

(22) Filed: May 9, 2012

(51) Int. Cl.
| | |
|---|---|
| *G01S 13/88* | (2006.01) |
| *G01S 7/28* | (2006.01) |
| *G01V 3/12* | (2006.01) |
| G01S 13/89 | (2006.01) |
| G01S 13/00 | (2006.01) |
| G01V 3/00 | (2006.01) |

(52) U.S. Cl.
USPC .......... 342/22; 342/21; 342/27; 342/73; 342/82; 342/89; 342/94; 342/175; 342/176; 342/179; 342/195

(58) Field of Classification Search
CPC ............ G01S 7/02; G01S 7/28; G01S 7/282; G01S 7/285; G01S 13/02; G01S 13/04; G01S 13/08; G01S 13/10; G01S 13/88; G01S 13/885; G01S 13/89
USPC ............... 342/21, 22, 27, 28, 73, 82, 88–103, 342/175, 176, 179, 189, 192–197
See application file for complete search history.

(56) References Cited

U.S. PATENT DOCUMENTS

| | | | | |
|---|---|---|---|---|
| 4,008,469 A | * | 2/1977 | Chapman | 342/22 |
| 4,430,653 A | * | 2/1984 | Coon et al. | 342/22 |
| 5,339,080 A | * | 8/1994 | Steinway et al. | 342/22 |
| 5,420,589 A | * | 5/1995 | Wells et al. | 342/22 |
| 5,442,362 A | * | 8/1995 | Zwarts | 342/176 |
| 5,483,243 A | * | 1/1996 | Gramlich et al. | 342/189 |
| 5,835,054 A | * | 11/1998 | Warhus et al. | 342/22 |
| 5,886,662 A | * | 3/1999 | Johnson | 342/22 |
| 5,900,833 A | * | 5/1999 | Sunlin et al. | 342/22 |
| 5,920,285 A | * | 7/1999 | Benjamin | 342/22 |
| 6,002,357 A | * | 12/1999 | Redfern et al. | 342/22 |
| 6,690,316 B2 | * | 2/2004 | Yankielun | 342/22 |
| 6,894,637 B2 | * | 5/2005 | Moreira et al. | 342/22 |
| 7,167,124 B2 | * | 1/2007 | Annan et al. | 342/22 |
| 7,173,560 B2 | * | 2/2007 | Li et al. | 342/22 |
| 7,415,244 B2 | * | 8/2008 | Kolinko et al. | 342/22 |
| 7,586,433 B1 | * | 9/2009 | Johansson et al. | 342/22 |
| 7,612,704 B2 | * | 11/2009 | Ryerson et al. | 342/22 |
| 7,881,671 B2 | * | 2/2011 | Sayeed et al. | 342/175 |
| 8,035,551 B1 | * | 10/2011 | Govoni | 342/196 |
| 8,106,812 B2 | * | 1/2012 | Andersson | 342/22 |
| 8,232,915 B2 | * | 7/2012 | Peterson | 342/192 |

* cited by examiner

*Primary Examiner* — Bernarr Gregory

(74) *Attorney, Agent, or Firm* — Faegre Baker Daniels LLP

(57) ABSTRACT

A system and method for pseudo real time collection of receive signal data in a single- or multi-channel ground penetrating radar. Each channel transmits electromagnetic impulses into a medium under test during each of a plurality of runs over the medium. Run receive signals are received in response to the transmitted impulses. Each run receive signal is sampled multiple times at a run sample rate. The sample points of each run are delayed by delay sequences with respect to the sample points of the other runs. The sample points of the individual runs are stored as a composite set of sample points representative of a receive signal sampled at an effective sample rate equal to a multiple of the run sample rate where the multiple is the number of runs.

39 Claims, 12 Drawing Sheets

PSEUDO REAL TIME RECEIVE SIGNAL SAMPLING FOR GROUND PENETRATING RADAR

FIELD OF THE INVENTION

The invention relates generally to ground penetrating radar systems. In particular, the invention is a method and apparatus for collecting data representative of signals received at the receiver antenna of the radar.

BACKGROUND

Ground penetrating radar (GPR) systems, also sometimes referred to as ultra wideband radar, are generally known and used in a wide variety of applications to examine the properties of an area of ground or other medium under test. These instruments include one or more sets of transmitting and receiving antennas. The transmitting antenna transmits a pulse of electromagnetic waves into the medium under test. After propagating through the test medium where they reflect against objects (e.g., pipes) and interfaces (e.g., concrete and soil interfaces), the transmitted waves are received by the receiving antenna. Properties of the transmitted waves such as amplitude, frequency, phase and polarization change during the propagation through the test medium. The signal received at the receiving antenna is then processed by the system to generate information displays that can be reviewed to determine the nature and conditions of the test medium such as the properties of the test medium and the location of objects buried in the medium.

In its most common implementation, GPR is a time domain radar system characterized by relatively high bandwidth and high sensitivity. Typically the fractional bandwidth is in excess of about 0.8 or 1.0., and the sensitivity is greater than 80 dB. Center frequencies of the transmitted waves range from a few megahertz up to about 4-6 GHz. For example, relatively low frequency GPRs (e.g., 20-200 MHz) can be used for deep geological investigations, mid-frequency instruments (e.g., 200 MHz-1 GHz) can be used for geotechnical investigations, and relatively high frequency instruments (e.g., higher than 1 GHz) can be used for high resolution (e.g., concrete) applications.

The received signal is typically digitized before being processed. 16-bit analog-to-digital (A/D) converters are commonly used for this purpose in commercial GPRs. Although a 16 bit A/D converter can theoretically provide a sensitivity of 96 dB, GPRs with these converters typically show less sensitivity due to the wide bandwidth and bandwidth connected noise as well as to internal system noise and external noise.

Commercially available A/D converters cannot be operated fast enough to digitize the received signals at a sufficiently high rate to derive the desired information from the signals in real time. Instead, transmitter and receiver pairs are typically operated in a synchronous manner with the transmitter transmitting one pulse for each sampled data point to be collected from the associated received signal. For each transmitted pulse from the transmitter the receiver sampling point is moved slightly in time, thereby effectively sampling the received signals with a sampling period equal to the time movement of the receiver's sampling point between the samples. The wavelet or set of sample points representing a "received signal" or one waveform are therefore derived from many different received signals. This approach is known as stroboscopic, repetitive or equivalent time sampling. Since a single sample of the received signal is collected for each activation of the transmitter, it follows that the frequency of the transmitter activation, a parameter known as the repetition rate, is equal to the actual data capture rate of the receiver. GPR repetition rates can vary over a wide range (e.g., 10 kHz-1 MHz), and are often in the range of 100-400 kHz.

The time required to gather a wavelet is therefore directly related to the repetition frequency. For example, if the repetition frequency is 100 kHz and the desired number of digitized points is five hundred, the total time required to collect the sampled data points for one waveform is 5 msec. Assuming the same number of desired data points, the time to capture a waveform decreases linearly with increases in the repetition rate. Output power of the radar, as measured by certifying organizations, also increases linearly with repetition rate. The result is that GPRs can be somewhat limited in speed in certain applications. Vehicle mounted devices, for example, are often run at lower than optimal speeds due to limitations of the repetition frequency. The linear dependence of the total emitted power with the repetition frequency, together with regulatory emission level constraints, can impact the commercial availability and use of GPRs. Raising the repetition frequency above 1 MHz to compensate for slower speeds has proven to be difficult due to high power consumption in the transmitter electronics and regulatory constraints on emissions. Because of interference between them, it is also difficult to operate GPRs with more than one transmitter/receiver antenna pair or to operate more than one GPR close to each other. These proximity interference-related problems can be alleviated by synchronizing the operation of the transmitter/receiver antenna pairs into different time slots.

Known GPRs also employ an averaging methodology known as stacking. Stacking is implemented by collecting sets of data points for several wavelets and averaging the corresponding data points of the sets to calculate an average value of each data point. The set of data points representative of a given wavelet is therefore an average of the sets of data points for several corresponding wavelets. Stacking effectively reduces the noise and thereby increases the signal/noise ratio of the signals being processed for analysis, and can thereby effectively increase the depth penetration of the GPR system. Unfortunately, stacking is done at the expense of the effective data collection rate.

Changes in the triggering or firing rate of a GPR transmitter can produce disturbances in the emitted electromagnetic pulses that degrade the overall accuracy of the system. During use, even when not being operated to collect data at specific positions on the ground, GPR systems are often kept running to help maintain steady thermal conditions of the transmitter and other electronics. Operation in this manner enhances the transmitter firing rate stability of the GPR.

There remains a continuing need for improved GPRs. In particular, there is a need for GPRs with enhanced speed and sensitivity. A GPR capable of providing these advantages within regulatory emission guidelines would be especially advantageous.

SUMMARY

The present invention is an improved system and method for collecting receive signal data in a ground penetrating radar (GPR). The invention can enhance the speed and sensitivity of the data collection process and/or maintain or lower output power levels.

One embodiment of the invention is a method for operating a ground penetrating radar channel that includes generating a trigger signal for each one of a plurality of data collection runs. The trigger signals are configured to trigger the transmission of ground penetrating electromagnetic waves. A run receive signal is received at an A/D converter in response to each ground penetrating electromagnetic wave. Each run receive signal is A/D sampled at a sampling rate to produce a run set of sample points, including sampling each run receive signal at a different delay sequence with respect to a beginning of the run receive signal. The run sets of sample points are stored as a composite set of sample points representative of a signal sampled with an effective sampling rate that is greater than the sampling rate at which the run receive signals were sampled.

Another embodiment of the invention is a method for synchronizing multiple ground penetrating radar channels of the type operated in accordance with the embodiment described above. This embodiment includes generating a common channel synchronization signal and providing the synchronization signal to each channel. A time slot of the trigger signals of each channel is set to the channel synchronization signal, and the trigger signals of each channel are set to a different and non-overlapping time slot. The trigger signals of each channel within the set time slot are also synchronized to the channel synchronization signal.

In some embodiments of the invention generating the trigger signals includes delaying the generation of the trigger signals by the delay sequences with respect to the A/D sampling. In other embodiments A/D sampling includes delaying the A/D sampling by the delay sequences with respect to the trigger signals.

DETAILED DESCRIPTION

Figure 1:
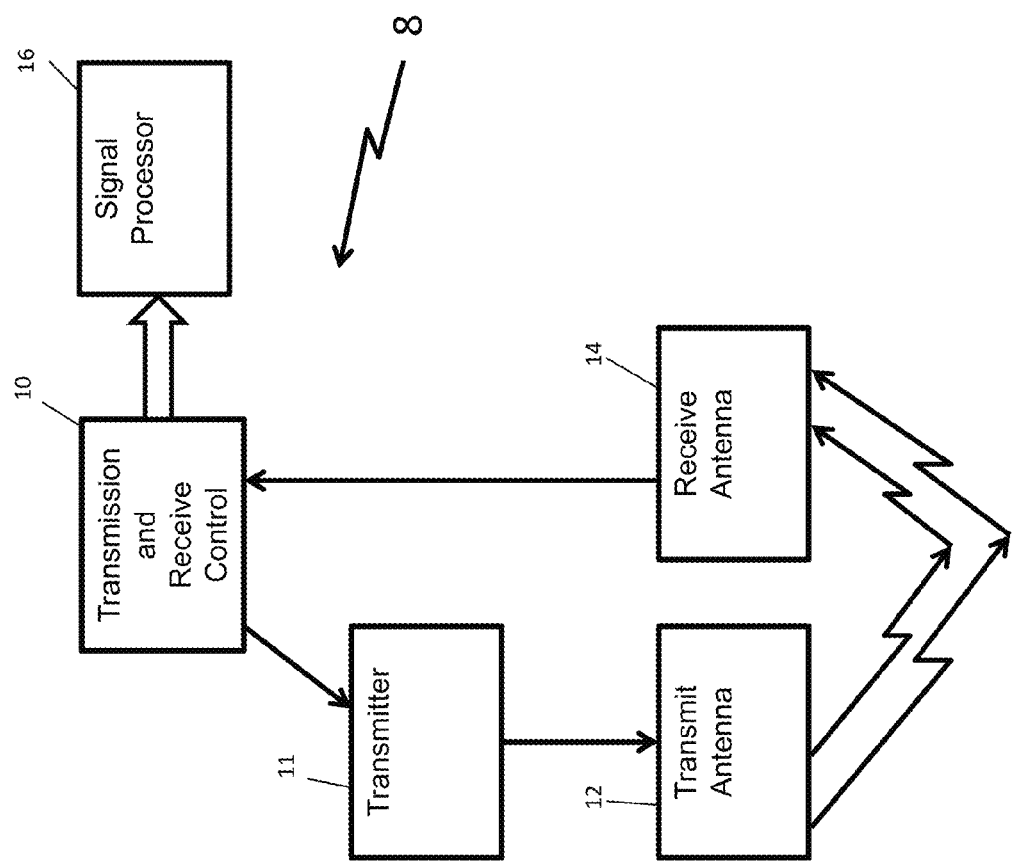
FIG. 1 is a high level block diagram of a ground penetrating radar (GPR) having a transmission and receive control in accordance with one embodiment of the present invention.

FIG. 1 is a block diagram illustration of a ground penetrating radar (GPR) 8 including a transmission and receive control 10 in accordance with one embodiment of the present invention. As shown, the transmission and receive control 10 is coupled to a transmit antenna 12 through a transmitter 11, to a receive antenna 14 and to a signal processor 16. Control 10 causes transmitter 11 to periodically transmit pulses of electromagnetic waves at a repetition rate through transmit antenna 12 and into a medium under test. The transmitted wave pulses, including portions that reflect off of objects and interfaces in the test medium, are received by antenna 14. Antenna 14 produces receive signals representative of the received waves. Control 10 collects and stores the receive signals. The receive signals are then processed by signal processor 16 to provide information about the medium under test.

Transmission and receive control 10 collects and stores the receive signals in digital wavelet form as sets of sample points. In particular, control 10 uses a multiple-run and multiple sample-per-transmit or receive signal method to enable the pseudo real time collection of composite sets of wavelet data representative of the signals received at the GPR receive antenna 14. This signal data collection method can be described generally with respect to FIGS. 2 and 3. During each of a plurality of data collection sequences or runs in connection with a test medium, the control 10 generates a transmit initiation or trigger signal to actuate the transmitter 11. In response to each of the transmitted pulses a receive signal is detected by the antenna 14 and coupled to control 10. An analog/digital (A/D) converter (not shown in FIG. 2) receives and samples the receive signals at an A/D clock rate. Four data collection runs are shown for purposes of example in FIG. 2, although other embodiments use cycles of two, three or more than four runs to collect data for each wavelet. Each run receive signal is sampled multiple times (e.g., on the downward edge transitions of the A/D clock). Control 10 controls the timing of the sampling so that each run receive signal is sampled at a different delay sequence with respect to an initiation point or beginning of the run receive signal. In the example shown in FIG. 2, each of the four run receive signals is sampled at locations delayed from other sample locations by about one-fourth of the A/D clock period (i.e., the delay sequence corresponds to a phase difference of 90° with respect to the A/D sample clock period). In some embodiments described below the timing of the trigger signals is controlled to provide the delay sequences. In other embodiments the timing of the A/D sample clock is controlled to provide the delay sequences. The sample points collected in this manner are stored by control 10. As illustrated graphically in FIG. 3, the stored data points collected by this multiple-run and multiple sample-per-run method form a composite set of sample points representative of a "receive" signal or wavelet sampled at an effective sampling rate that is greater than the sampling rate at which the individual run receive signals were sampled.

Figure 4:
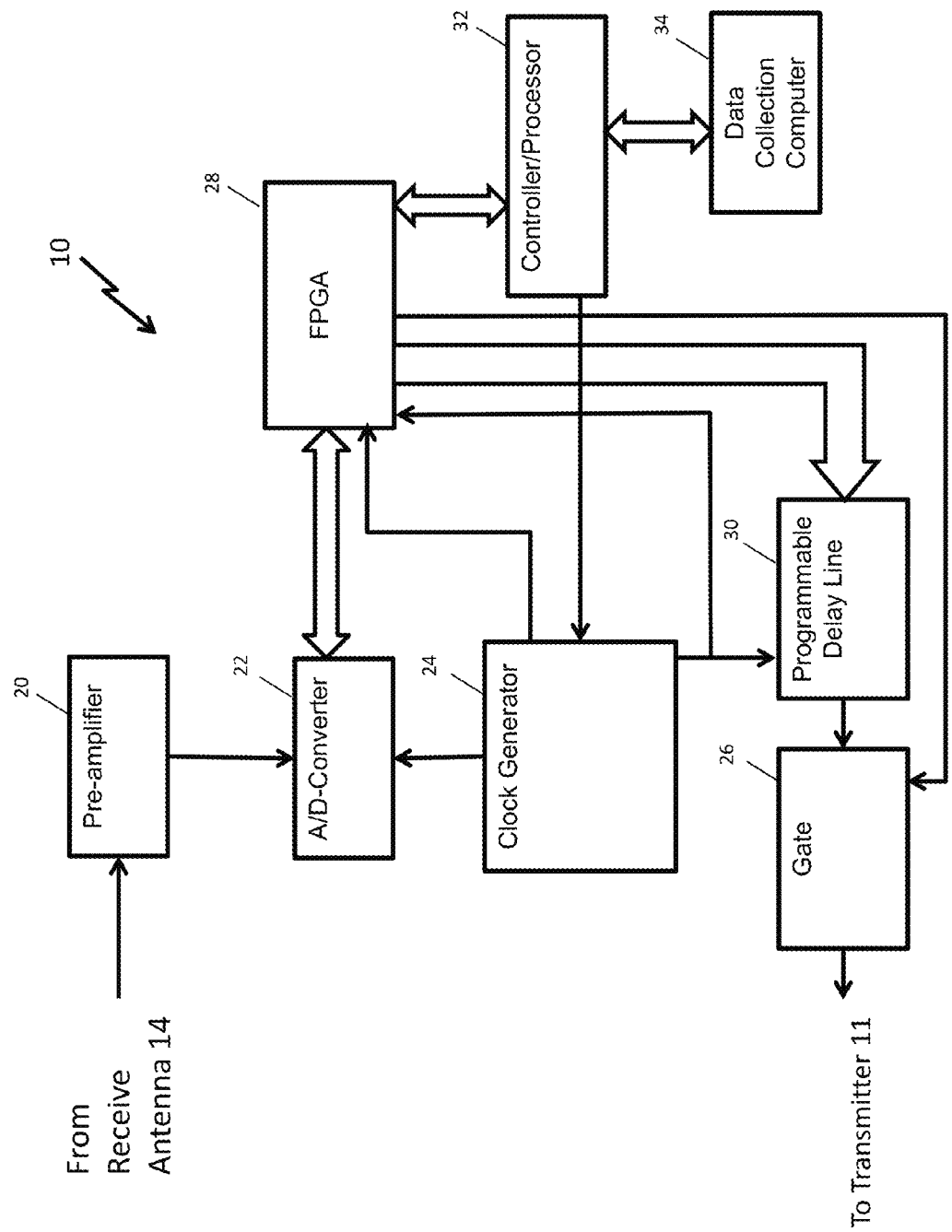
FIG. 4 is a block diagram of one embodiment of the transmission and receive control shown in FIG. 1.

FIG. 4 is a detailed block diagram of a transmission and receive control 10 in accordance with one embodiment of the invention. As shown, control 10 includes pre-amplifier 20, A/D converter 22, clock generator 24, gate 26, field programmable gate array (FPGA) 28, programmable delay line 30, controller/processor 32 and data collection computer 34. The clock generator 24 is programmed to a desired receive signal sample rate or frequency via the interface to the controller/processor 32, and provides the sample clock to the A/D converter 22 (typically as a differential clock signal). In one embodiment of the invention the A/D converter 22 runs permanently on this frequency, without change. In other embodiments the sample rate can change during runs. The sample rate can in some embodiments be 150 MHz or higher. The clock generator 24 is also connected (typically by a differential line) to provide a suitable clock to the FPGA 28. The frequency of the clock provided to FPGA 28 can be similar to the clock to the A/D converter 22, or higher, dependent on the synchronization scheme selected between the FPGA and the A/D converter.

The trigger signals are generated at the repetition rate. As discussed in greater detail below, the repetition rate is preferably relatively constant during data collection runs. The repetition rate can be varied and selected by an operator. For example, the operator may want to lower the repetition rate to operate the GPR 8 at lower power emission levels. The ability to operate at lower power emission levels can enhance compliance with regulatory requirements.

FPGA 28 captures data from the A/D converter 22 via a parallel data bus interface. A clock signal with a similar clock frequency to that fed to the A/D converter 22 is also provided to the FPGA 28 from the A/D converter 22 in some embodiments. The clock signal provided to the FPGA 28 from the A/D converter 22 is however synchronized with the parallel sample data on the bus, thus providing efficient means for capturing the data.

The clock generator 24 also provides a trigger control clock of significantly lower frequency (e.g., 300 kHz in one embodiment) for controlling the triggering of the transmitter 11. In the illustrated embodiment the transmitter trigger control clock is provided to the programmable delay line 30, but in other embodiments can also be provided to the gate 26 or directly to the transmitter 11. This lower frequency transmitter trigger control clock is also fed back to the FPGA 28 in the illustrated embodiment, and provides precise information on when the transmitter 11 will emit a signal to the transmitting antenna 12 since the delay programmed in the programmable delay line 30 between the clock generator 24 and the transmitter is known. The programmable delay line 30 is programmed by the FPGA 28 via a fast parallel interface in the illustrated embodiment. FPGA 28 also controls the gate 26 (via a single signal line in the illustrated embodiment). The gate 26 can be a simple electronic gate or buffer and functions as a trigger control by allowing or not allowing a trigger signal to reach the transmitter. In other embodiments (not shown) the gate 26 can be connected to couple an inhibit signal input to the programmable delay line 30. By not allowing the trigger signal to pass to the transmitter 11, lower emission levels can be reached at the expense of data capture rate. The impulse/step generated by the transmitter 11 is transferred to the antenna 12 directly or by means of a balun (not shown). As described above, the transmitted radar wave propagates trough the test medium and reflects back at interfaces to the receive antenna 14, from where it is transferred to the pre-amplifier 20 (typically a differential amplifier). From the pre-amplifier 20 the run receive signal is coupled to and received at the A/D converter 22.

The capture of the receive signal sample data can be managed by data collection software running in the data collection computer 34. The controller/processor 32 stores in associated memory (not separately shown) parameters for the data collection. These parameters can include repetition frequency, number of averages (stacks), number of samples to digitize per run, number of iterations or runs the systems will run, position of first sample in the envelope (e.g., in terms of clock cycles prior to or after the clock or trigger to the transmitter 11) and delay sequences for programming the programmable delay line 30 between runs. The controller/processor 32 programs the clock generator 24 for the sample frequency to the A/D converter 22 and FPGA 28. A down-converted, but synchronized version of the clock signal is also effectively fed to the transmitter 11 via the programmable delay line 30 and gate 26.

The controller/processor 32 also programs the FPGA 28 with the number of samples to collect per run, the cycle number of iterations (runs), position of first sample, and the different delay sequences to write to the programmable delay line 30 between each run. The repetition frequency may be transferred to the FPGA 28 if the clock generator 24 is unable to generate a low enough clock frequency to the programmable delay line 30, in which case the FPGA can effectively divide the trigger signal to the transmitter 11 by disabling/enabling the gate 26. The FPGA 28 can operate in this manner since the clock to the programmable delay line 30 from the clock generator 24 is fed back to the FPGA, and this clock signal has a significantly lower frequency than the clock fed to the FPGA directly from the clock generator 24. It follows that the gate 26 is not necessary in some embodiments of the invention (e.g., if the clock-generator 24 can generate a low enough transmitter firing rate or if the capability to alter the transmitter trigger rate is not needed).

After the transmission and receive control 10 has been set up as described above, it will be in an initial state with the first delay programmed in the delay line 30. The FPGA 28 will then wait for a signal from the controller/processor 32 to start data collection. The controller/processor 32 can, for example, initiate a receive signal collection cycle in response to a command from the data collection computer 34. In other embodiments (not shown), to determine when an envelope is to be gathered, the controller/processor 32 can read a certain number of pulses from a measuring wheel, read a certain amount of time-tics from a clock, or use a time or position from a GPS receiver. When the controller/processor 32 detects a condition such as one of those above, it causes the FPGA 28 to start acquisition by asserting a signal or sending a command. In some embodiments the FPGA 28 has constantly kept track of when, in time, the clock to the programmable delay line 30 is about to transition and generate a trigger to the transmitter 11, and can thus exactly initiate data capture from a predetermined time, with reference to the excitation of the transmitter 11. A predetermined number of samples, equal to the pre-set total number of desired samples divided by the number of runs chosen, are then collected from the first run receive signal. The FPGA 28 stores the collected samples in appropriate positions in a memory. In one embodiment of the invention the memory used for storing samples resides inside the FPGA, although other memory structures and locations are used in other embodiments. Appropriate positions can be determined by the number of runs. If four runs are being used, for example, the first sequence of sampled data points can be stored in positions logically corresponding to 0, 4, 8 etc. (i.e., the modulo number of runs). These memory positions are only examples, and other embodiments of the invention can use other positions.

After the first run set of sample data has been captured, the FPGA 28 programs the programmable delay line 30 for the next set of samples by writing the next delay value to the delay line and waits for the next run start condition. The subsequent run start conditions can be the same as those of the first run, but are done with a different delay of the trigger to the transmitter 11. Sample data capture and storage can in other respects be done in the manner described above for the first run. Following the example used above, the second run sample data can be stored in locations 1, 5, 9, etc. of the memory. This process is repeated for a cycle having the programmed number of runs. The resulting composite waveform will be sampled with an effective sampling period determined by the time delays programmed in the programmable delay line 30. The runs can be executed in any order, and the invention is not limited to a certain gathering pattern. Furthermore, although described in connection with an embodiment that uses the same sample rate for all runs, other embodiments of the invention (not shown) are configured to make use of different sample rates for different runs.

High resolution A/D converters capable of 16-bit (96 dB) digitization at greater than 150 MHz (such as National Semiconductors ADC16DV160 or Texas Instruments ADS5484) can, for example, be used to implement the invention. Other embodiments of the invention make use of other A/D converters having other characteristics. High precision clock generation circuits, capable of producing clocks for the above mentioned A/D converters as well as lower frequency clocks, synchronized, and with low time jitter (e.g., less than a few picoseconds) (such as National Semiconductors LMK04000B or Silicon Labs Si5338) can be used. Still other embodiments of the invention use other clocks. Embodiments of the invention can also be implemented using high precision, fast settling, programmable delay lines, capable of stepping a delay in increments of about 10 picoseconds (such as Micrel's SY89295U). The invention can also be configured with other programmable delay lines or other approaches for providing the sample delay sequences between runs. Those skilled in the art will also recognize that known or otherwise conventional details of implementation are omitted from the functional diagram in FIG. 4 to simplify the description. For example, different signal levels and their conversions are not shown, as approaches for converting differential signals to single ended signals are well known. Power supplies, impedance matching networks and bus specifications are also well known.

Figure 2:
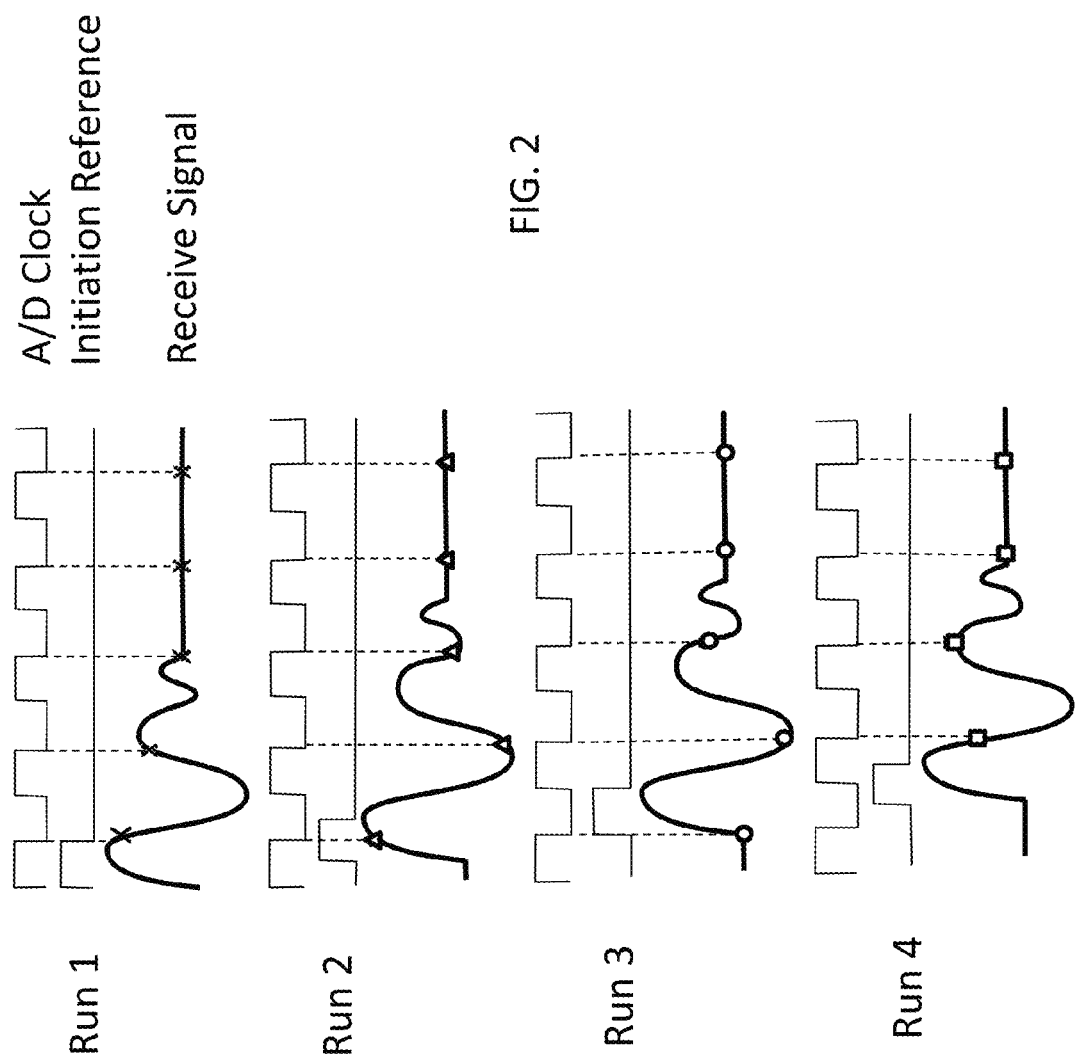
FIG. 2 is a timing diagram illustrating the multiple-run and multiple sample-per-transmit signal pseudo real time wavelet data collection method of the present invention.
Figure 3:
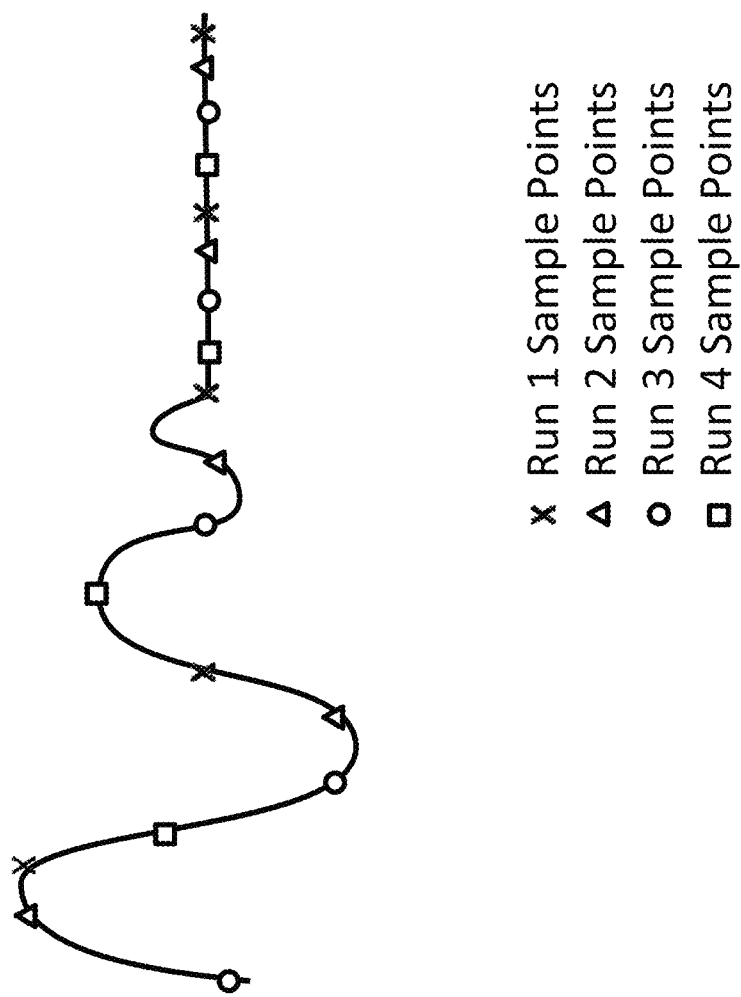
FIG. 3 is an illustration of a composite set of data points collected in accordance with the method illustrated in connection with FIG. 1 and representative of a receive signal.

The operation of the GPR 8 and transmission and receive control 10 shown in FIGS. 1 and 4 can be described in connection with the timing and waveform diagrams of FIGS. 2 and 3, where the trigger signal produced at the output of gate 26 is the initiation reference shown in FIG. 2. In the following example the A/D clock has a frequency of 156.25 MHz and has a period of 6400 psec. The four run receive signal waveforms are shown in relation to the transmitter trigger signal. The A/D converter 22 digitizes instant values of the run receive signals present at the output of the pre-amplifier 20 at falling edges of the A/D clock as shown. The start position can be freely selectable through programming of the clock chip. All the envelopes shown in FIG. 2 are synchronized with each other and the time jitter between them is low and preferably in the picosecond range. The run 1 envelope shows the transmitter trigger with no, or a first delay programmed in the programmable delay line 30.

Run 1 shows the timing relation between the transmitter trigger signal and the A/D clock during the initial sampling. In this example the transmitter trigger shows a rising edge 3200 psec. prior to the first A/D conversion or sample. The sampling continues to convert the incoming run receive signal at the same sampling frequency, and the FPGA 28 reads and stores the resulting values until the appropriate number of samples have been taken (five run 1 samples are shown in FIG. 2 for purposes of example). Following the completion of the run 1 sampling, the next run is prepared by reprogramming the programmable delay line 30.

Run 2 is executed in the same way as run 1, with the same starting position, but the programmable delay will delay the transmitter trigger signal 1600 psec. compared with the previous run. Runs 3 and 4 are executed in the same way, with delays of 3200 and 4800 psec., respectively.

The number of samples collected in each run is generally no more than the number that can be collected during the period of the transmitter trigger signal (e.g., approximately 3.2 µsec. in this example). Typically the number of samples are chosen to be somewhat less than what might be available during the transmitter trigger signal period in order to make room (time) for writing a new value to the programmable delay line 30 before the initiation of the following run.

If for example 468 samples are collected during each run, the composite "receive" signal is sampled with an effective sample frequency of 1/1.6 nanosec.=625 MHz over a time window of approximately 3 µsec. The composite receive signal sample data set then has a total of 1872 samples. A total time of 4×3.3 µsec.=13.2 µsec. was required to collect this composite set of run signal sample points. In contrast, if the same envelope had been digitized with the same settings using conventional technology such as that described above in the background section, it would have taken 1872×3.3 µsec.=6178 µsec. This embodiment of the invention is therefore 468 times faster, which amounts to approximately 27 dB more efficient power management. The efficiency ratio between this invention and conventional technology increases as the A/D clock frequency increases and the effective sampling frequency decreases.

In the embodiments described above, the programmed delay sequences are given as fractions of the period time of the A/D clock. As a practical matter, many delay lines do not provide resolutions sufficient to achieve this result. To overcome this limitation the sample data can be re-sampled after collection to correct for the lack of uniform sampling frequency. Since the sampling points locations are precisely known, this resampling and correction can be performed by simple linear interpolation, or more advanced polynomial methods. By way of example, the re-sampling can be done by the FPGA, 28, by the controller/processor, 32, or by the data collection computer, 34.

The embodiment of the invention described in connection with FIG. 4 is configured to provide the delay sequences by controlling the transmitter trigger signal delays with respect to the A/D sample clock (i.e., "transmitter side" delay sequence control). Other embodiments of the invention are configured differently to control the delay sequences. For example, as described in greater detail below a transmission and receive control otherwise similar to or the same as that shown in FIG. 4 can be configured with the programmable delay line between the clock generator and the A/D converter. The timing or delay of the A/D sampling clock can then be controlled with respect to trigger signals (i.e., "receiver side" delay sequence control).

Figure 5:
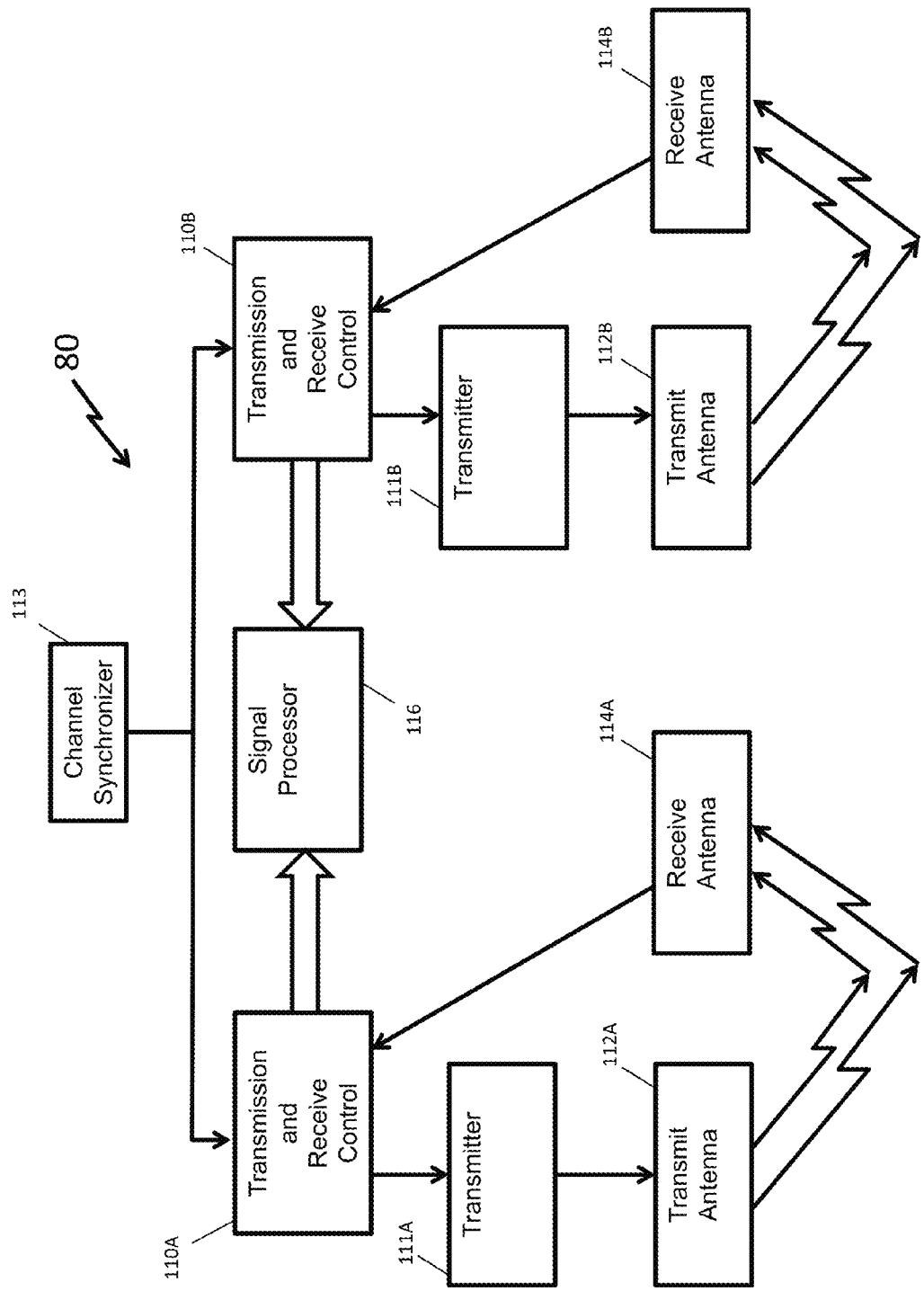
FIG. 5 is a high level block diagram of a multiple channel GPR in accordance with another embodiment of the invention.

FIG. 5 is a block diagram illustration of a multi-channel GPR 80 including transmission and receive controls 110A and 110B and a channel synchronizer 113 in accordance with another embodiment of the invention. As shown, each transmission and receive control 110A, 110B is coupled to a transmit antenna 112A, 112B through a transmitter 111A, 111B, a receive antenna 114A, 114B, and signal processor 116. Controls 110A, 110B cause respective transmitters 111A, 111B to periodically transmit pulses of electromagnetic waves through the transmit antennas 112A, 112B into a medium under test. The transmitted waves, including portions that reflect off of objects and interfaces in the test medium, are received by the respective antenna 114A, 114B, and the antenna produces receive signals representative of those received waves. Controls 110A and 110B collect and store the receive signals. The receive signals are then processed by signal processor 116 to provide information about the medium under test. Multiple channel GPR 80 can gather multiple data sets during one pass over a medium under test, thereby enhancing the speed of data collection.

Channel synchronizer 113 generates a channel synchronization signal that is provided to both transmission and receive controls 110A and 110B. Using the synchronization signal the controls 110A and 110B operate and gather data during different and independent time slots. In the illustrated embodiment a common channel synchronization signal is provided to the controls 110A and 110B. The channel synchronization signal can be asynchronous with respect to the controls 110A and 110B, and can have a substantially lower frequency than the transmitter firing frequency. An advantage of the synchronization system used in GPR 80 is that it does not require the distribution of a sensitive, differential or high-frequency clock throughout the system.

Figure 6:
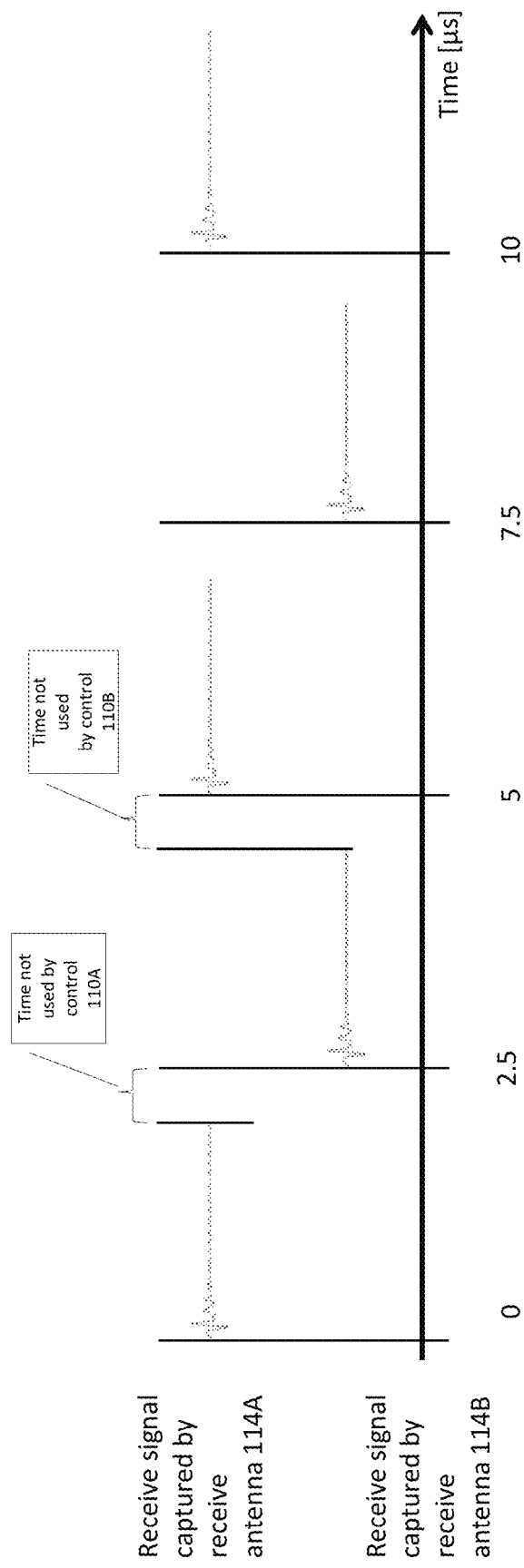
FIG. 6 is a timing diagram illustrating the separate time slots of the receive signals collected by the multiple channel GPR shown in FIG. 5.

The time slot assignment or setting operation achieved by controls 110A and 110B in response to the synchronization signal generated by channel synchronizer 113 can be described generally with reference to FIG. 6. In this example the transmission and receive controls 110A and 110B cause the respective transmitters 111A and 111B to operate at transmitter firing rates of 200 kHz and occupy different time slots. The transmission of electromagnetic waves by transmitters 111A and 111B, and the collection of the respective run receive signals at antennas 114A and 114B, can thereby be done without interfering with each other. Each channel has "unused" time in their respective slots, and as described below, this unused time is used for synchronization purposes. Although other windows are contemplated for the invention, ground penetrating radar typically need no more than a 1-2 μsec. time windows for the run receive signals since the media under test normally prevents reflections from deeper objects (that might result in later-received relevant signal portions) from being detected.

Figure 7:
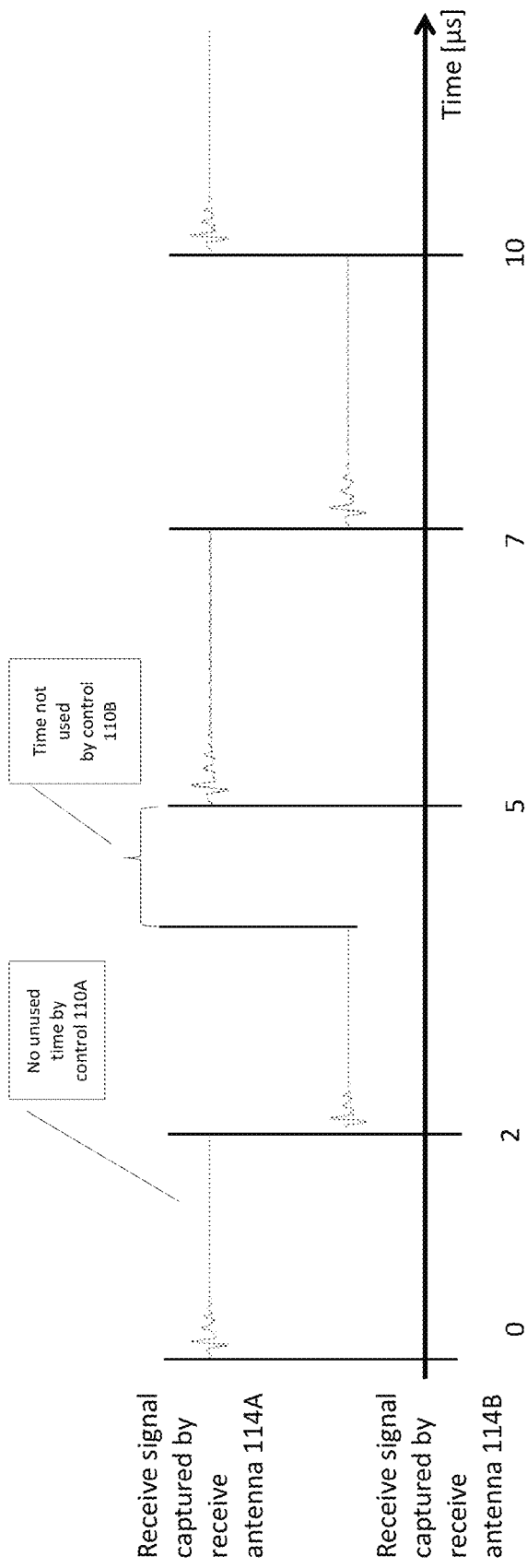
FIG. 7 is a timing diagram illustrating an alternative time slot assignment of the receive signals collected by the multiple channel GPR shown in FIG. 5.

It is generally advantageous in a GPR system such as 80 that the firing or repetition rate of the transmitters be kept as stable as possible (i.e., relatively constant). Relatively small deviations can be accommodated (e.g., in the range of 0.1%), but relatively large jumps in the firing rate (e.g., from a period of 5 μsec. to a period of 4 μsec.) can cause sufficient disturbances of the emitted wavelets to decrease the accuracy of the system. However, it is typically not necessary to the operation of the GPR 80 that the time between the firing of transmitters 111A and 111B being kept precise. FIG. 7 is an example where the firing position of transmitter 111B has been moved closer to transmitter 111A so that no unused time is left for transmitter 111A. Consequently, more unused time is now present for transmitter 111B and receiver 111B. The amount of unused time can be even longer that what is shown in FIG. 7. The example of FIG. 7 therefore illustrates that the synchronization signal produced by channel synchronizer 113 does not have to be extremely precise or frequent in time.

Using the concepts described in connection with FIGS. 6 and 7 it possible to operate two or more sets of GPR antenna and receiver pairs simultaneously without data quality deterioration. Each transmitter such 111A and 111B is assigned or set to a specific firing frequency and each transmitter should be separated from all other transmitters by a time slot or period that is long enough to prevent the signals of any transmitter from entering into the time slots of any other transmitters. Since there is typically a sufficient amount of unused time, the accuracy of time slot allocation is generally not critical. By way of example, accuracies in the range of about 0.2-0.5 μsec. should be sufficient to ensure useful multi-channel data gathering.

Figure 8:
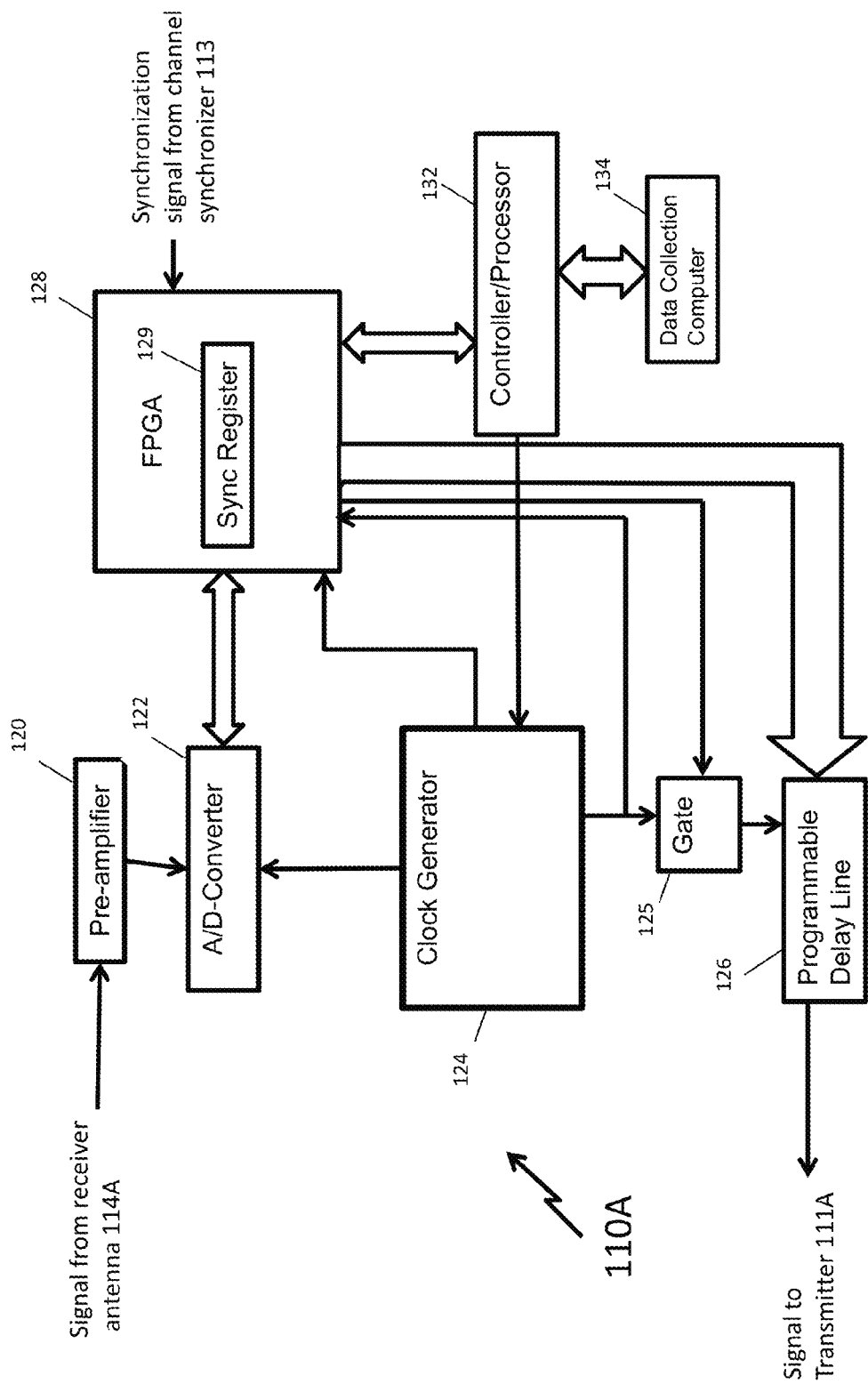
FIG. 8 is a block diagram of one embodiment of a transmission and receive control shown in FIG. 5.

FIG. 8 is a detailed block diagram of transmission and receive control 110A in accordance with one embodiment of the invention. Control 110B can be the same as or similar to control 110A. As shown, control 110A includes pre-amplifier 120, A/D converter 122, clock generator 124, gate 125, programmable delay line 126, field programmable gate array (FPGA) 128, controller/processor 132 and data collection computer 134. With the exception of the differences described below and related to the multi-channel synchronization function, the components of control 110A can function in a manner similar to or the same as the corresponding components in control 10 and described above.

In addition to the sample clock provided to the A/D converter 122, the clock generator 124 provides a trigger clock of significantly lower frequency (e.g., 3-4 MHz in one embodiment) for triggering and synchronization of the transmitter 111A into selected time slots. This trigger clock is also fed back to the FPGA 128 and provides precise information of when the transmitter trigger signals will be produced at the output of the programmable delay line 126 since the delay programmed in the programmable delay line is known and relatively small. The programmable delay line 126 is programmed by the FPGA 128 via a fast parallel interface in the embodiment shown. Gate 125, which can for example be a simple electronic gate or buffer, receives trigger control signals from the FPGA 128 and serves the purpose of allowing or not allowing a trigger signal to reach the transmitter 111A. In alternative embodiments (not shown) the trigger control signal can be an inhibit signal input to the programmable delay line 126. By not allowing the trigger signal to pass to the transmitter 111A, lower emission levels can be reached at the expense of data capture rate. In this embodiment of the invention the gate 125 also serves the purpose of setting the transmitter trigger signals to a certain time slot with regard to the transmitter trigger signals of other channels such as that of control 110B. To enhance the ability of the trigger clock applied to the gate 125 to function as a synchronization signal, the frequency of the trigger clock should be substantially higher than the frequency of the "final" trigger signals produced at the output of the programmable delay line 126 and passed to the transmitter 111A. Under this scenario the FPGA 128 is active in down converting the frequency of the trigger clock from the clock generator 124 via the gate 125.

The FPGA 128 receives the channel synchronization signal from the channel synchronizer 113. Channel synchronizer 113 can be an external control unit. The synchronization signal is provided to all the transmission and receive controls being used in the multi-channel GPR (e.g., controls 110A and 110B in the 2-channel system shown in FIG. 8), and can be a relatively low frequency signal (e.g., in the range 1 Hz-100 Hz in one embodiment). The synchronization signal preferably has an asserting edge with a relatively fast rise time (e.g., 10 nsec.). The selected trigger clock frequency may be dependent on the drifts in the oscillator (not separately shown) input to the clock generator 124. If for instance an oscillator with a drift of 1 ppm is used, the maximum drift will be 1 μsec./sec. and a 1 Hz synchronization signal will be sufficient if 1 μsec. is the accuracy desired between the time slots. In general, the higher the transmitter firing rate and the higher the number of channels, the higher the desired frequency of the synchronization signal. The synchronization signal serves the purpose of allowing the FPGA 128 to set or occupy a certain time slot for the transmitter (e.g., transmitter 111A) with respect to other transmitter(s) in the multi-channel GPR (e.g., transmitter 111B), and to synchronize the transmitter trigger signals within the set time slot.

Figure 9:
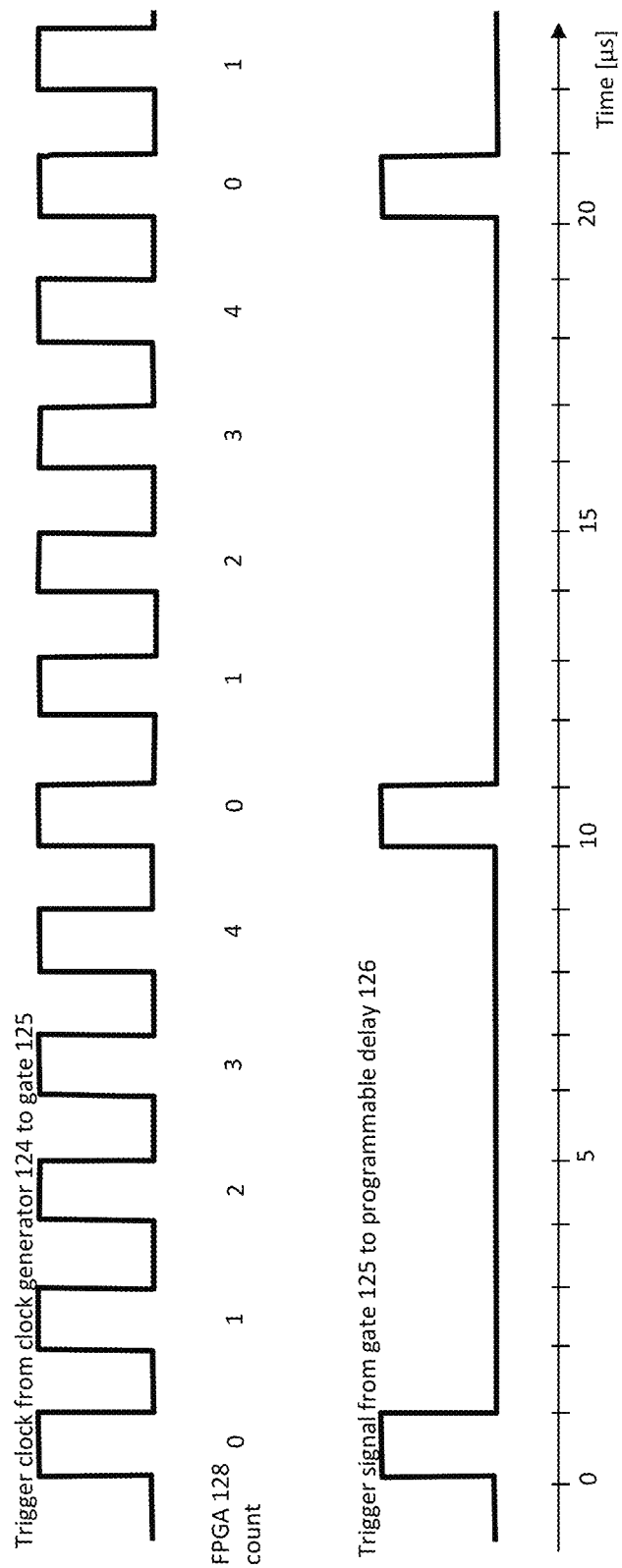
FIG. 9 is a timing diagram illustrating the operation of the gate of the transmission and receive control shown in FIG. 5.

The FPGA 128 keeps an internal counter which counts the number of cycles of the trigger clock reaching the gate 125 from the clock generator 124. The FPGA 128 is, by counting these pulses, able to both set and synchronize the firing rate of the transmitter 111A. The firing rate is effectively set by controlling when the trigger clock signals are allowed to pass the gate 125. For example, if a trigger clock of 500 kHz from the clock generator 124 is applied to the gate 125 and a transmitter repetition rate of 100 kHz is desired, the FPGA 128 can provide a trigger control signal to the gate that will block four trigger clock pulses, letting the fifth trigger clock pulse to pass while zeroing the counter, block four clock pulses, letting the fifth to pass while zeroing the counter, etc. etc. This timing arrangement is illustrated in FIG. 9. The choice of frequencies in this description of FIG. 9 is for example only. Other frequencies can be used in other embodiments of the invention.

Figure 10:
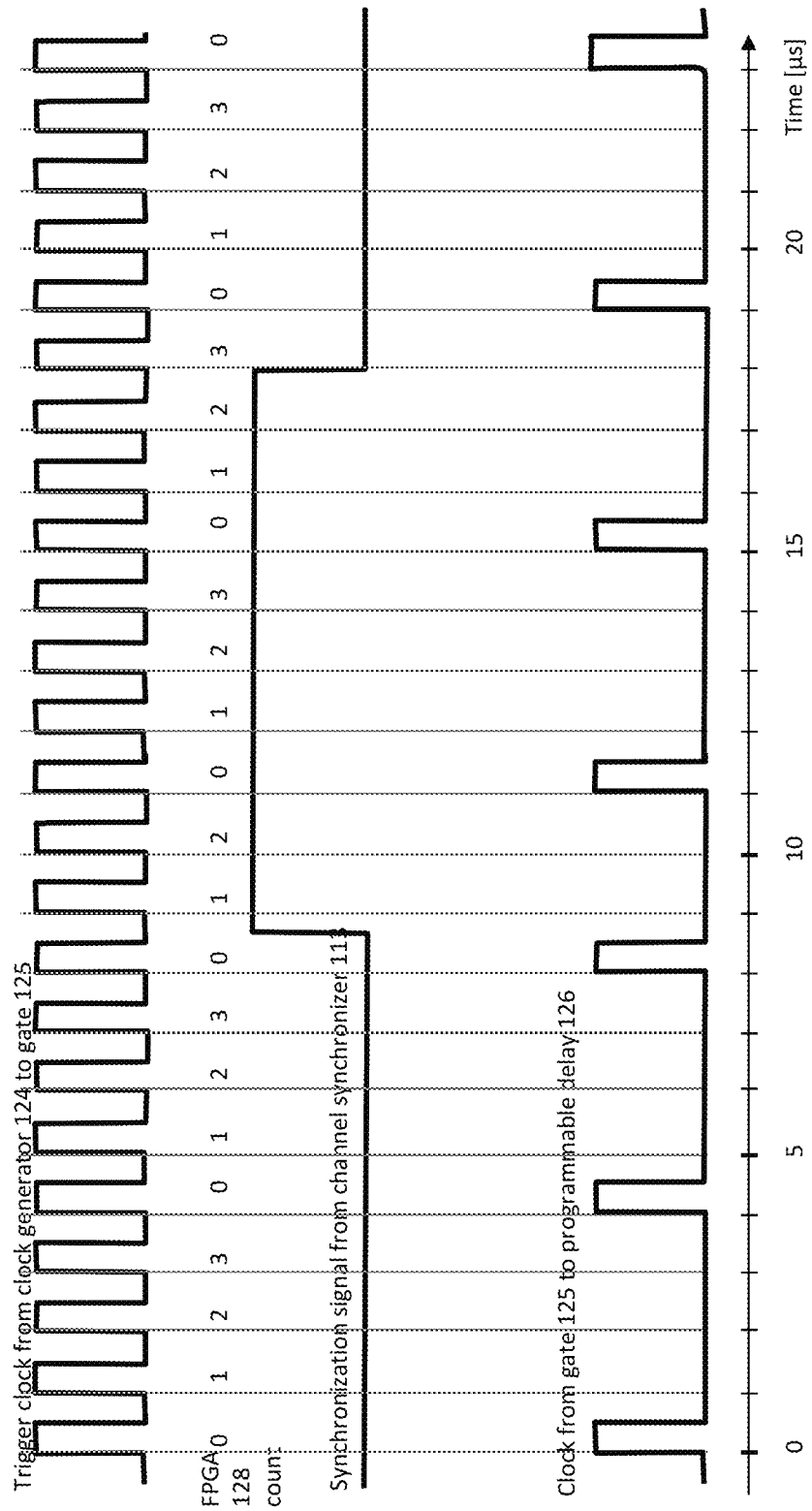
FIG. 10 is a timing diagram illustrating the synchronization operation of the transmission and receive control shown in FIG. 5 when the synchronization signal is asserted at a time that a run receive signal data collection process is not being performed.

As described above, the synchronization signal generated by the channel synchronizer 113 can be asynchronous to the other signals in the GPR 80 and of arbitrary frequency. However, the synchronization signal should be frequent enough that the drifts in the clock generator 124 do not amount to a time long enough for letting the transmitter 111A to move into another transmitter's time slot (e.g., the time slot of transmitter 111B). The synchronization signal can be received at any time, but in one embodiment is implemented only directly after or before the acquisition of a run receive signal. For example, GPR systems such as 80 are commonly operated to collect data at specific positions over ground, in between which they are kept running, without gathering of data, to help maintain steady thermal conditions. As a result, there is often more time when data collection is not taking place than time for actual data collection. If the synchronization signal is asserted when there is not active data collection occurring, synchronization of the transmitter time slot is done immediately in one embodiment, as detailed below. If the synchronization signal is asserted during data collection, the location of the synchronization signal with respect to the actual transmitter 111A firing sequence (the FPGA count in FIG. 9) is registered in a sync register 129 (FIG. 9) or other counter location, and the synchronization of the transmitter time slot is done after the data acquisition is finished (e.g., immediately after) in one embodiment. The FPGA sync register 129 is zeroed each time the system is synchronized and overwritten, with the latter actual FPGA count value, if two synchronization signals are received during the same data collection sequence used to collect a composite set of run receive signal data. Assuming for purposes of example that the transmitter 111A has been allocated a time slot two cycles after a synchronization signal is asserted, a clock generator 124 providing a 1 MHz trigger clock to the gate 125 and a repetition rate of 250 kHz, the synchronization operation when the synchronization signal is asserted when no data gathering from a run receive signal is occurring is illustrated in FIG. 10.

It is not necessary to use the same physical signal for counting and controlling the synchronization as in the embodiment described in connection with FIG. 8. Commercially available clock generators can typically produce an identical clock signal on several output ports. In yet other alternative embodiments another clock of higher or equal frequency could also be used, provided it is synchronized with the synchronization signal. The illustrated embodiment that counts using the trigger clock provided by the clock generator 124 is an example.

Figure 11:
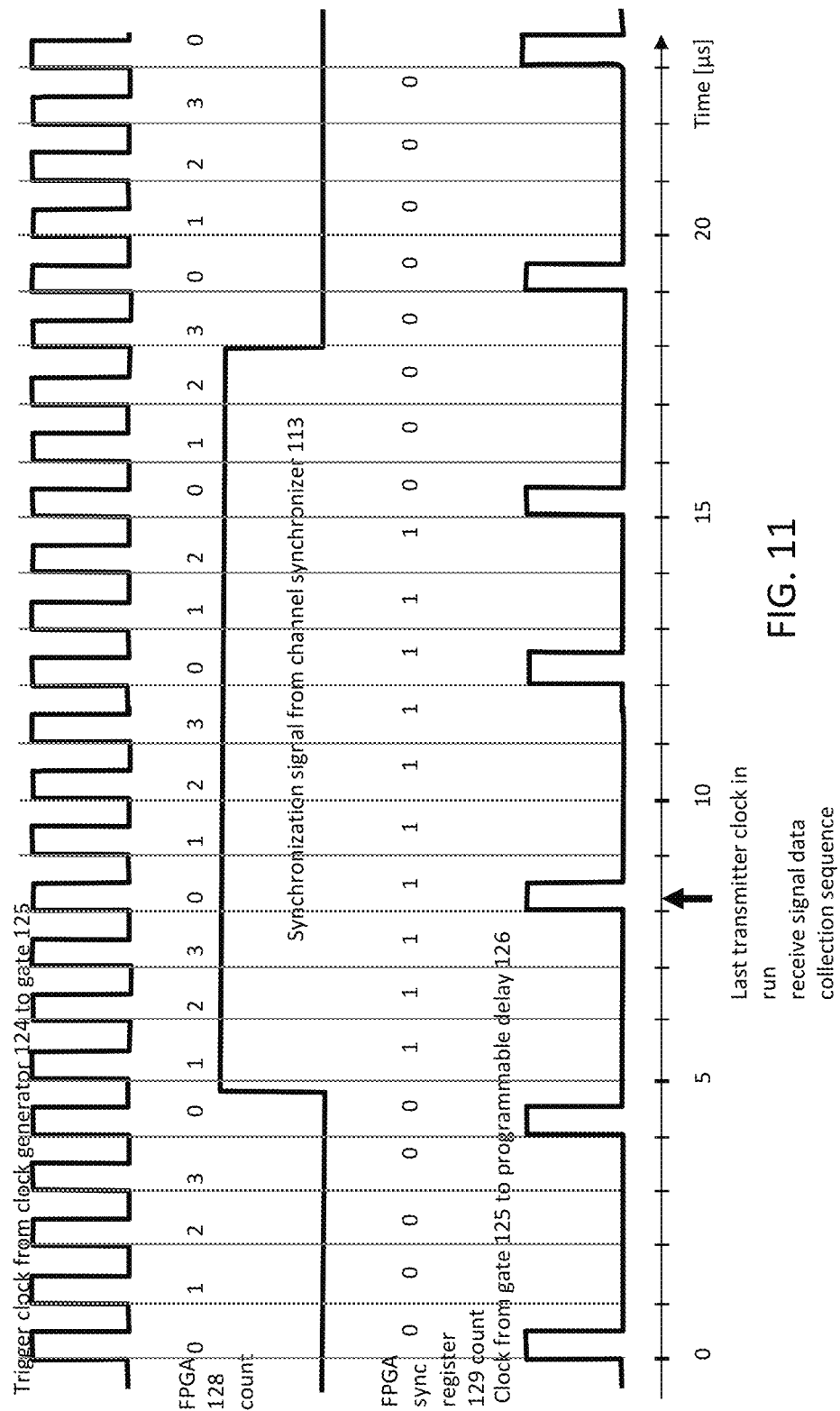
FIG. 11 is a timing diagram illustrating the synchronization operation of the transmission and receive control shown in FIG. 5 when the synchronization signal is asserted at a time that a run receive signal data collection process is being performed.

FIG. 11 illustrates the synchronization operation in accordance with one embodiment of the invention when the synchronization signal is asserted during run receive signal data acquisition and the sync register 129 is loaded with the value of the count of FPGA 128 on the rising edge of the trigger clock from the clock generator 124. As shown, the synchronization is done one clock after the last clock in the data collection sequence. The reason for delaying the synchronization by one extra clock cycle prior to implementing the synchronization is to let the system utilize all useful time of the last transmitter sequence, which can be longer than one clock.

After the control 110A has been set up, it will typically be in an initial state with the first delay programmed in the delay line 126. Prior to any run receive signal data collection, at least one assertion of the synchronization signal is typically received and implemented as described above. After synchronization the different transmitters 111A and 111B will be allocated and set to individual time slots and the controls 110A and 110B are ready for data capture. All assertions of the synchronization signal are processed by the embodiment described above, although other embodiments process only some assertions of the synchronization signal.

Transmission and receive control 110A collects composite sets of run receive signal data in a manner similar to that of control 10 described above. Although the embodiment shown in FIG. 11 is configured with a transmitter side programmable delay 126 to provide the delay sequences to the transmitter trigger signals, in other embodiments (not shown) the programmable delay is coupled to the A/D converter 122 as a receive side delay to delay the sample clock by the delay sequences. In this alternative embodiment the signal generated at the output of the gate can function as the transmitter trigger signal. Other than the channel synchronization functionality described above, transmission and receive controls 110A and 110B of GPR 80 can be operated in a manner similar to or the same as control 10 of GPR 8. After the last receive signal run, the control 110A will check for any received synchronization signal during the previous data collection cycle, and response in the manner described above.

Figure 12:
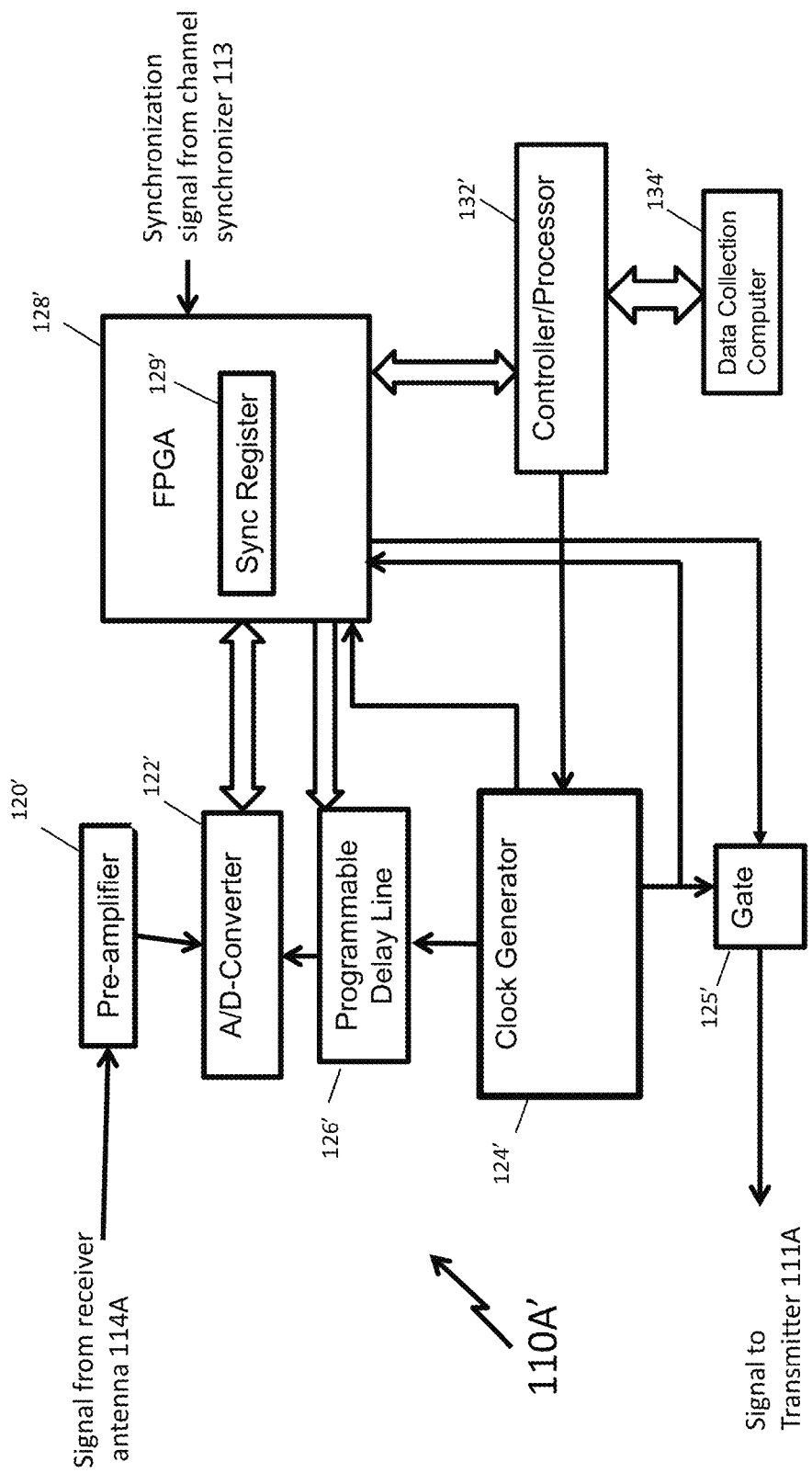
FIG. 12 is a block diagram of a second embodiment of the transmission and receive control shown in FIG. 5.

FIG. 12 is a detailed block diagram of transmission and receive control 110A' in accordance with another embodiment of the invention. Control 110A' is configured with a programmable delay line 126' located between the A/D converter 122' and the clock generator 124' to provide the delay sequences by controlling the timing or delay of the A/D sampling clock with respect to the trigger signals (i.e., a "receiver side" delay sequence control). Other than these differences, control 110A' can be similar to or substantially the same as control 110A described above, and similar functional components are indicated with similar reference numbers. Single channel GPR in accordance with the present invention, such as that described in connection with FIG. 1, can also be implemented with receiver side delay sequence control.

Although the present invention has been described with reference to preferred embodiments, those skilled in the art will recognize that changes can be made in form and detail without departing from the spirit and scope of the invention.

What is claimed is:
1. A method for operating a ground penetrating radar channel, comprising:

generating a trigger signal for each one of a plurality of data collection runs, wherein the trigger signals are configured to trigger the transmission of ground penetrating electromagnetic waves;
receiving at an A/D converter a run receive signal in response to each ground penetrating electromagnetic wave;
A/D sampling each run receive signal at a sampling rate to produce a run set of sample points, including sampling each run receive signal at a different delay sequence with respect to a beginning of the run receive signal; and
storing the run sets of sample points as a composite set of sample points representative of a signal sampled with an effective sampling rate that is greater than the sampling rate at which the run receive signals were sampled.

2. The method of claim 1 wherein generating the trigger signals includes delaying the generation of the trigger signals by the delay sequences with respect to the A/D sampling.

3. The method of claim 1 wherein A/D sampling includes delaying the A/D sampling by the delay sequences with respect to the trigger signals.

4. The method of claim 1 using at least two runs and run sets of sample points for each composite set of sample points.

5. A method for synchronizing multiple ground penetrating radar channels of the type operated in accordance with the method of claim 1, comprising:
generating a common channel synchronization signal and providing the synchronization signal to each channel;
setting a time slot of the trigger signals of each channel to the channel synchronization signal, wherein the trigger signals of each channel are set to a different and non-overlapping time slot; and
synchronizing the trigger signals of each channel within the set time slot to the channel synchronization signal.

6. The method of claim 5 wherein generating the channel synchronization signal includes generating a channel synchronization signal having a substantially lower frequency than a frequency of the trigger signals.

7. The method of claim 6 wherein generating the channel synchronization signal includes generating an asynchronous channel synchronization signal.

8. The method of claim 7 wherein synchronizing the trigger signals of each channel includes immediately synchronizing the trigger signals of the channel to the channel synchronization signal if a run receive signal is not being A/D sampled by the channel upon assertion of the channel synchronization signal.

9. The method of claim 8 wherein synchronizing the trigger signals of each channel includes delaying the synchronization of the trigger signals of the channel to the channel synchronization signal if a run receive signal is being A/D sampled by the channel upon assertion of the channel synchronization signal.

10. The method of claim 7 wherein synchronizing the trigger signals of each channel includes delaying the synchronization of the trigger signals of the channel to the channel synchronization signal if a run receive signal is being A/D sampled by the channel upon assertion of the channel synchronization signal.

11. The method of claim 5 wherein synchronizing the trigger signals of each channel includes immediately synchronizing the trigger signals of the channel to the channel synchronization signal if a run receive signal is not being A/D sampled by the channel upon assertion of the channel synchronization signal.

12. The method of claim 11 wherein synchronizing the trigger signals of each channel includes delaying the synchronization of the trigger signals of the channel to the channel synchronization signal if a run receive signal is being A/D sampled by the channel upon assertion of the channel synchronization signal.

13. The method of claim 5 wherein synchronizing the trigger signals of each channel includes delaying the synchronization of the trigger signals of the channel to the channel synchronization signal if a run receive signal is being A/D sampled by the channel upon assertion of the channel synchronization signal.

14. The method of claim 1 wherein generating a trigger signal includes generating a trigger signal having a relatively constant repetition rate.

15. The method of claim 1 and further including varying the rate of the trigger signals, including lowering the trigger signal rate.

16. A system for collecting receive signal data in a ground penetrating radar channel, comprising:
a trigger generator to generate trigger signals for each one of a plurality of dates collection runs, wherein the trigger signals are configured to trigger the transmission of ground penetrating electromagnetic waves;
an A/D converter to receive run receive signals in response to the electromagnetic waves and to sample the run receive signals at a sampling rate and generate run sets of sample points;
a clock generator to provide a sample clock to the A/D converter;
a delay sequence control to cause the A/D converter to sample the run receive signals at different delay sequences with respect to beginnings of the run receive signals; and
memory to store the run sets of sample points having different delay sequences as a composite set of sample points representative of a signal sampled with an effective sampling rate that is greater than the sampling rate at which the run receive signals were sampled.

17. The system of claim 16 wherein the delay sequence control is coupled to the trigger generator and the clock generator, and causes the trigger generator to generate the trigger signals at different delay sequences with respect to the sample clock.

18. The system of claim 17 wherein the delay sequence control includes:
a programmable delay coupled to the trigger generator; and
a controller coupled to the programmable delay to load delay values in the programmable delay.

19. The system of claim 16 wherein the delay sequence control is coupled to the A/D converter and the trigger generator, and causes the A/D converter to generate the run sets of sample points at different delay sequences with respect to the trigger signals.

20. The system of claim 19 wherein the delay sequence control includes:
a programmable delay coupled to the A/D converter; and
a controller coupled to the programmable delay to load delay values in the programmable delay.

21. The system of claim 16 and further including:
a synchronization signal input to receive a channel synchronization signal; and
a synchronization control coupled to the synchronization signal input and the trigger generator, to set a time slot of the trigger signals to one a plurality of non-overlapping time slots and to synchronize the trigger signals within the time slot to the synchronization signal.

22. The system of claim 21 wherein the synchronization control immediately synchronizes the trigger signals to the channel synchronization signal if a run receive signal is not being A/D sampled upon assertion of the synchronization signal.

23. The system of claim 22 wherein the synchronization control delays the synchronization of the trigger signals if a run receive signal is being A/D sampled upon assertion of the synchronization signal.

24. The system of claim 23 wherein the gate generates trigger signals having a relatively constant repetition rate.

25. The system of claim 23 and further including a trigger control to control, including lower, the trigger signal rate.

26. The system of claim 21 wherein the synchronization control delays the synchronization of the trigger signals if a run receive signal is being A/D sampled upon assertion of the synchronization signal.

27. The system of claim 16 wherein the trigger generator generates trigger signals having a relatively constant repetition rate.

28. The system of claim 16 and further including a trigger signal control to control, including lower, the trigger signal rate.

29. A system for collecting multiple channels of receive signal data in a ground penetrating radar, comprising:
   a channel synchronizer for generating a channel synchronization signal; and
   a plurality of channels, each channel including:
      a gate connected to receive trigger control signals and a trigger clock, wherein the trigger clock has a higher frequency than the trigger control signals and the gate gates the trigger clock as a function of the trigger control signal to generate a trigger signal during each of a plurality of data collection runs, wherein the trigger signals are configured to trigger the transmission of ground penetrating electromagnetic waves;
      an A/D converter to receive run receive signals in response to the electromagnetic waves and to sample the run receive signals at a sampling rate and generate run sets of sample points;
      a clock generator to provide a sample clock to the A/D converter and the trigger clock to the gate;
      a programmable delay connected to received delay sequence control signals;
      a programmed controller coupled to the channel synchronizer, the gate and the programmable delay, the programmed controller:
         generating the delay sequence control signals to cause the A/D converter to sample each run receive signal at a different delay sequence with respect to a beginning of the run receive signal; and
         generating the trigger control signals to set a time slot of the trigger signals to one a plurality of non-overlapping time slots and to synchronize the trigger signals within the time slot to the channel synchronization signal; and
      memory to store the run sets of sample points having different delay sequences as a composite set of sample points representative of a signal sampled with an effective sampling rate that is greater than the sampling rate at which the run receive signals were sampled.

30. The system of claim 29 wherein the channel synchronizer generates an asynchronous channel synchronization signal.

31. The system of claim 30 wherein the channel synchronizer generates a channel synchronization signal having a substantially lower frequency than a frequency of the trigger signals.

32. The system of claim 29 wherein the programmable delay is coupled to the gate and delays the trigger signals.

33. The system of claim 29 wherein the programmable delay is coupled between the clock generator and the A/D converter and delays the sample clock.

34. The system of claim 29 wherein the programmed controller is a field programmable gate array.

35. The system of claim 29 wherein the programmed controller includes a counter to count trigger clock pulses and generates the trigger control signals as a function of the trigger clock pulse count.

36. The system of claim 29 wherein the programmed controller includes a sync register to store data relating to the timing relationship between an assertion of the channel synchronization signal and the set time slot for the trigger signals, and generates the trigger control signals as a function of the stored data in the sync register.

37. The system of claim 36 wherein the sync register stores a count value of the trigger clock when the channel synchronization signal is asserted.

38. The system of claim 37 wherein the programmed controller generates the trigger control signals immediately if a run receive signal is not being A/D sampled by the channel upon assertion of the channel synchronization signal, and delays generation of the trigger control signals if a run receive signal is being A/D sampled by the channel upon assertion of the channel synchronization signal.

39. The system of claim 29 wherein the programmed controller generates the trigger control signals immediately if a run receive signal is not being A/D sampled by the channel upon assertion of the channel synchronization signal, and delays generation of the trigger control signals if a run receive signal is being A/D sampled by the channel upon assertion of the channel synchronization signal.

* * * * *